United States Patent [19]

Kasuga

[11] Patent Number: 5,074,160
[45] Date of Patent: Dec. 24, 1991

[54] FEED UNIT APPARATUS
[75] Inventor: Shinichi Kasuga, Maebashi, Japan
[73] Assignee: Nippon Seiko Kabushiki Kaisha, Tokyo, Japan
[21] Appl. No.: 525,192
[22] Filed: May 16, 1990
[30] Foreign Application Priority Data May 17, 1989 [JP] Japan .................. 1-124767

[51] Int. Cl.[5] ............. F16H 27/02; F16C 29/06; F16B 7/10
[52] U.S. Cl. .................... 74/89.15; 74/17.8; 74/459; 74/566; 277/80; 384/45; 384/446; 403/82; 403/DIG. 1
[58] Field of Search ............ 384/15, 45, 446; 277/80; 74/17.8, 566, 89.15, 459; 403/80, 82, 109, DIG. 1

[56] References Cited

U.S. PATENT DOCUMENTS

| | | | |
|---|---|---|---|
| 1,937,985 | 12/1933 | Schnuck | 384/15 |
| 2,303,438 | 12/1942 | Cornelius | 384/15 |
| 3,820,446 | 6/1974 | Granbom et al. | 92/88 |
| 4,481,869 | 11/1984 | Garlapaty | 92/88 |
| 4,512,208 | 4/1985 | Lipinski et al. | 74/89.15 |
| 4,552,483 | 11/1985 | Anderka et al. | 403/288 |
| 4,582,371 | 4/1986 | Mottate | 384/45 |
| 4,616,885 | 10/1986 | Komiya | 384/15 |
| 4,704,913 | 11/1987 | Zimmer | 74/89.17 |
| 4,706,510 | 11/1987 | Zimmer | 74/89.21 |
| 4,859,085 | 8/1989 | Buessinger et al. | 384/45 |

FOREIGN PATENT DOCUMENTS 61-61362 4/1986 Japan .

Primary Examiner—Allan D. Herrmann
Assistant Examiner—David W. Laub
Attorney, Agent, or Firm—Basile and Hanlon

[57] ABSTRACT

A guide rail has an axially extending recessed groove opening upwardly to guide a nut block to move rectilinearly along the recessed groove when a ball screw shaft is rotated. A pair of strip-shaped magnets are secured to upper surfaces of both side walls of the guide rail. A flexible seal plate made of steel sheet is fixed to the guide rail with its opposite ends fastened to opposite ends of the guide rail. The seal plate slidably engages a guide recess formed in the upper surface of the nut block and crosses axially over the nut block forming an expanded portion along the outer surface of the nut block. A seal pressing member is attached to the nut block to press the expanded portion of the seal plate downwardly, and also to guide the seal plate towards the belt-shaped magnets at front and rear portions of the expanded portion so that the seal plate is attracted by the magnets at portions located before and behind the expanded portion, i.e., the nut block, to cover the recessed groove of the guide rail.

2 Claims, 4 Drawing Sheets

FEED UNIT APPARATUS

BACKGROUND OF THE INVENTION

1. Field of the Invention:

The present invention relates to a feed unit apparatus made up of a ball screw mechanism integrally combined with a linear guide apparatus.

2. Description of the Prior Art:

A prior art feed unit apparatus in which a ball screw mechanism and a linear guide mechanism are combined with each other is disclosed, for example, in Japanese Utility Model Laid-Open Publication No. 61-61362. In this apparatus, the feed unit apparatus comprises a feed screw shaft (ball screw shaft) having a spiral groove in an outer surface, a linear guide rail (guide rail) disposed in parallel with the feed screw shaft, and a nut block including a linear guide means movably fitted into the linear guide rail in an axial direction and a nut section threaded around the feed screw shaft so that the linear guide means and the nut section are integrally formed with each other. A rotational movement of the nut block with respect to the feed screw shaft is prevented by the linear guide means.

However, in such a prior art feed unit apparatus, the linear guide rail has a recessed groove extending axially and opening upwardly, and the nut block is guided to move rectilinearly through rolling members within the recessed groove in accordance with rotation of the feed screw shaft disposed in the recessed groove. As a result, since the dust sealing against the feed screw shaft within the recessed groove and the rolling members for linear guiding is not sufficient, then the feed unit apparatus is used in a welding robot or the like, sputters produced during welding, dust, or the like are apt to enter the feed screw shaft and the rolling members for the linear guiding. Accordingly, problems are involved in that a malfunction is apt to be caused and, when the feed unit apparatus is used in a clean room, lubricating oil is scattered in the room contaminating the environment.

SUMMARY OF THE INVENTION

The present invention was made in view of the problems in the prior art mentioned above, and it is an object of the invention to provide a feed unit apparatus which has a superior dust sealing property in preventing sputters produced during welding, and dust or the like from entering the places of a feed screw shaft and the rolling members for linear guiding, and in preventing lubricating oil from scattering to the outside. It is also an object to provide a feed unit apparatus which is simple in assembling.

In order to achieve this object, a feed unit apparatus according to the present invention comprises a ball screw shaft having a spiral groove formed in an outer peripheral surface, a nut block threaded about the spiral groove through rolling members, a guide rail formed with a recessed groove extending axially and opening upwardly, the guide rail guiding the nut block to move rectilinearly within the recessed groove through the rolling members rolling in ball circulating paths, and end caps respectively fixed to axial opposite ends of the nut block and having the ball circulating paths formed therein. A pair of strip-shaped magnets are respectively secured to upper surfaces of both side walls of the guide rail so that the strip-shaped magnets extend over a whole axial range of the recessed groove. The nut block is formed with a guide recess extending axially in an upper surface of the nut block. A flexible seal plate is provided so that axial opposite ends thereof are fixed to opposite end portions of the guide rail, and the seal plate crosses over the nut block axially while being slidably engaged with the guide recess of the nut block. The flexible seal plate is attracted to the strip-shaped magnets at portions thereof located before and behind the nut block and covers the recessed groove of the guide rail. A seal pressing member is attached to the nut block to press downwardly an expanded portion of the seal plate, which expanded portion crosses axially over the nut block.

The seal pressing member is attached to the nut block preferably by projections which resiliently engage channels of the nut block.

The end caps are respectively formed with slant surfaces on upper surfaces to guide the expanded portion of the seal plate towards the magnets. The seal pressing member has slant surfaces formed in inner surfaces of opposite end portions so that each of the slant surfaces forms a gap between the slant surface of the end cap and the opposing slant surface of the sale pressing member to allow the seal plate to slidingly move through the gap.

In the feed unit apparatus structured as described above, the expanded portion of the seal plate which slidably engages the guide recess of the nut block and which crosses over the nut block axially is pressed downwardly by the seal pressing member. At the same time, the seal plate is attracted with lateral side portions thereof by the magnets at portions located before and after the nut block to cover the axial whole area of the recessed groove of the guide rail. As a result, it is possible to reduce the amount of lift of the seal plate from the magnets at front and rear portions of the expanded portion which is displaced with the movement of the nut block. Owing to this, it is difficult for sputters produced during welding, and dust or the like to enter the places of the ball screw shaft and the rolling members for linear guiding resulting in an improvement in the dust sealing property.

Furthermore, since the seal pressing member is attached to the nut block by the engagement of the channels and the projections, the attachment of the seal pressing member is simple.

Moreover, since each of the from and rear ends of the expanded portion of the seal plate are bent towards the magnets by the gap between the slant surface of the seal pressing member and the slant surface of the end cap, the amount of lift of the expanded portion from the magnets at the front and rear ends of the expanded portion is reduced. Thus, the dust sealing property is improved by the reduction of lifting of the expanded portion.

Furthermore, since the end caps and the seal pressing member are made from a synthetic resin having a small friction coefficient, the frictional resistance encountered by the seal plate at the time of displacement of the nut block is reduced, such that the nut block is displaced smoothly.

DESCRIPTION OF THE PREFERRED EMBODIMENT

Figure 1:
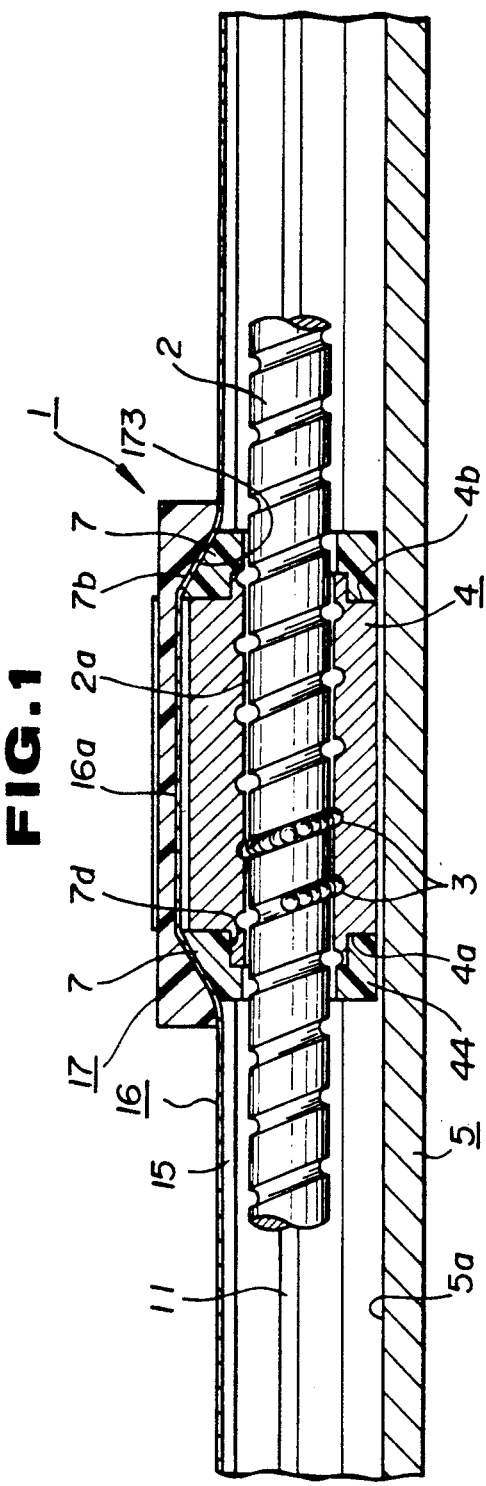
FIG. 1 is a longitudinal sectional view of a main part of a feed unit apparatus constructed in accordance with an embodiment of the present invention.

With reference to FIGS. 1 to 3 and 9, a feed unit apparatus 1 of an embodiment of the invention includes a ball screw shaft 2 having a spiral groove 2a formed in an outer peripheral surface, a nut block 4 threaded about the spiral groove 4d through a multiplicity of rolling members 3, a guide rail 5 extending axially and having a recessed groove 5a opening upwardly, the guide rail 5 guiding the nut block 4 to move rectilinearly within the recessed groove 5a through a multiplicity of rolling members 6 as the ball screw shaft 2 rotates, and end caps 7 respectively secured to axial opposite ends (axial front and rear ends) of the nut block 4.

Figure 4:
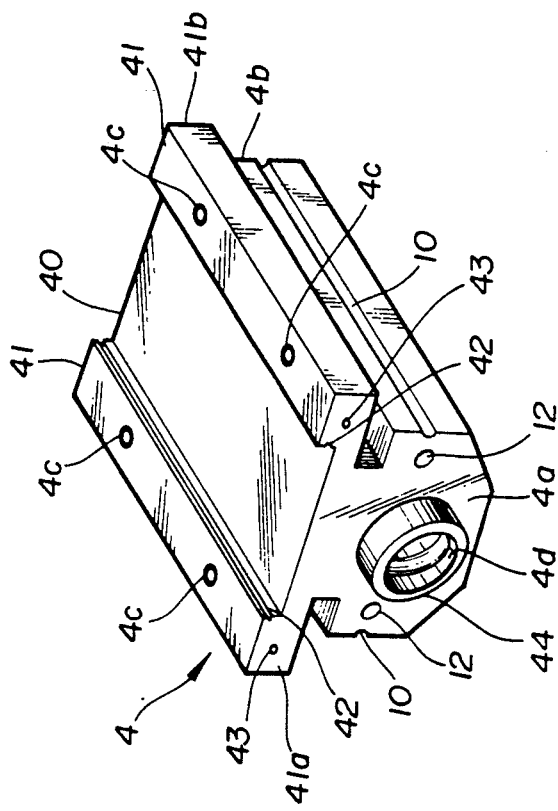
FIG. 4 is a perspective view of the nut block in FIG. 1.
Figure 5:
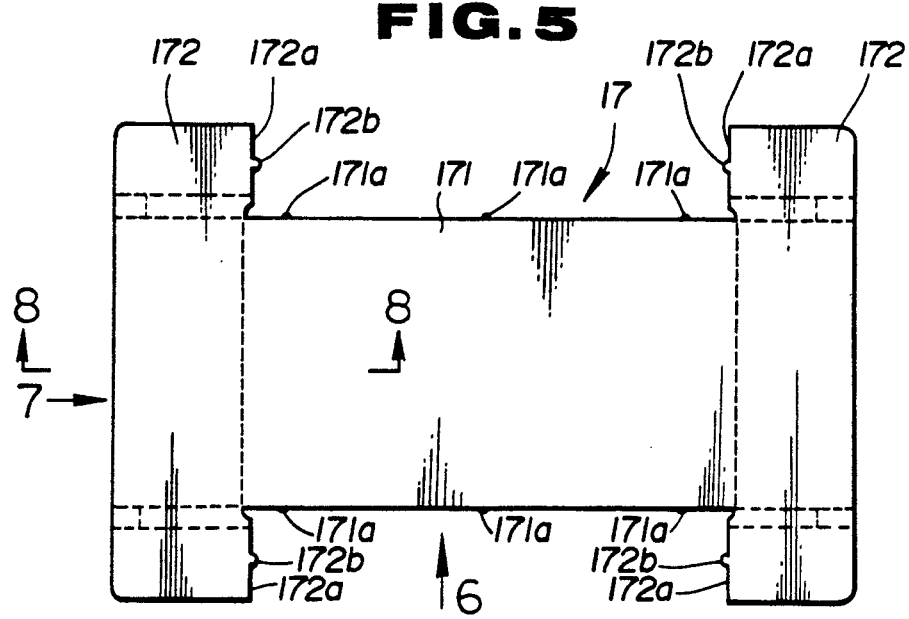
FIG. 5 is a plan view of the seal pressing member in FIG. 1.
Figure 9:
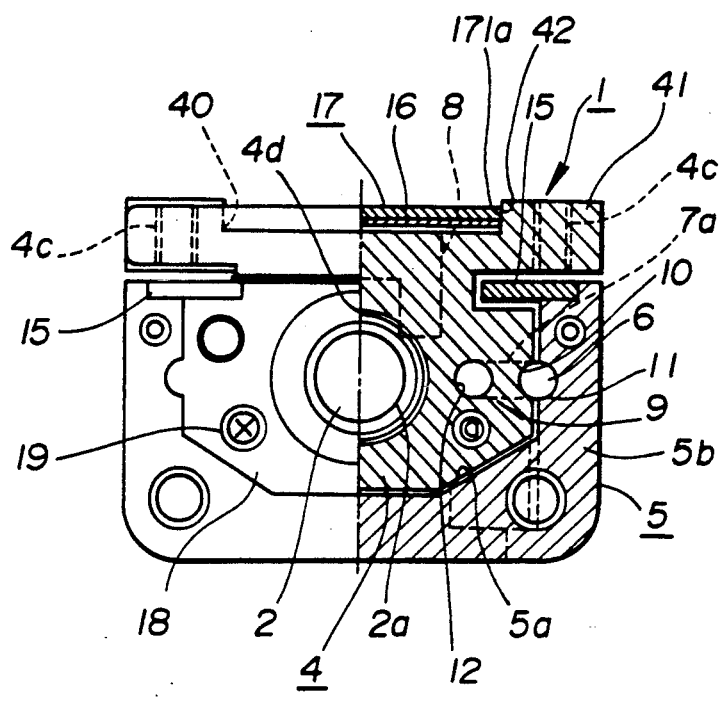
FIG. 9 shows at the right side of the center line a sectional view taken generally along the line 9R—9R in FIG. 2, and at the left side of the center line a view as viewed in the direction of arrow 9L in FIG. 2.
Figure 10:
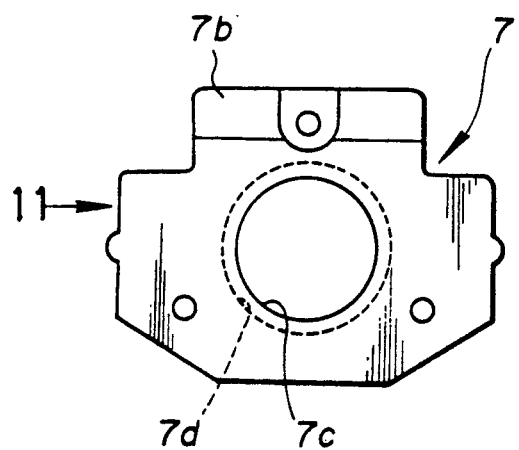
FIG. 10 is a front view of the end cap in FIG. 1.

The nut block 4 has a ball circulating path 8 (FIG. 9) which is disposed in communication with the spiral groove 2a of the ball screw shaft 2. When the rotation of the ball screw shaft 2 is transmitted to the nut block 4 through the rolling movement of the rolling members 3 circulating in the ball circulating path 8 with the rotation of the ball screw shaft 2, the nut block 4 is moved rectilinearly in the axial direction through the rolling movement of the rolling members 6 which circulate in ball circulating paths 9. As shown in FIGS. 4, 9 and 10, each of the ball circulating paths 9 is formed by a ball rolling path formed by ball rolling grooves 10 and 11 respectively formed in an outer side surface of the nut block 4 and in an inner surface of one side wall of the guide rail 5, a through bore 12 formed in the nut block 4 at an inside of the ball rolling groove 10 in parallel thereto, and curved ball grooves 7a formed respectively in the end caps 7. The nut block 4 has screw holes 4c formed in upper surfaces of both lateral edge portions for receiving bolts to mount the nut block 4 to a table or the like, not shown.

Figure 2:
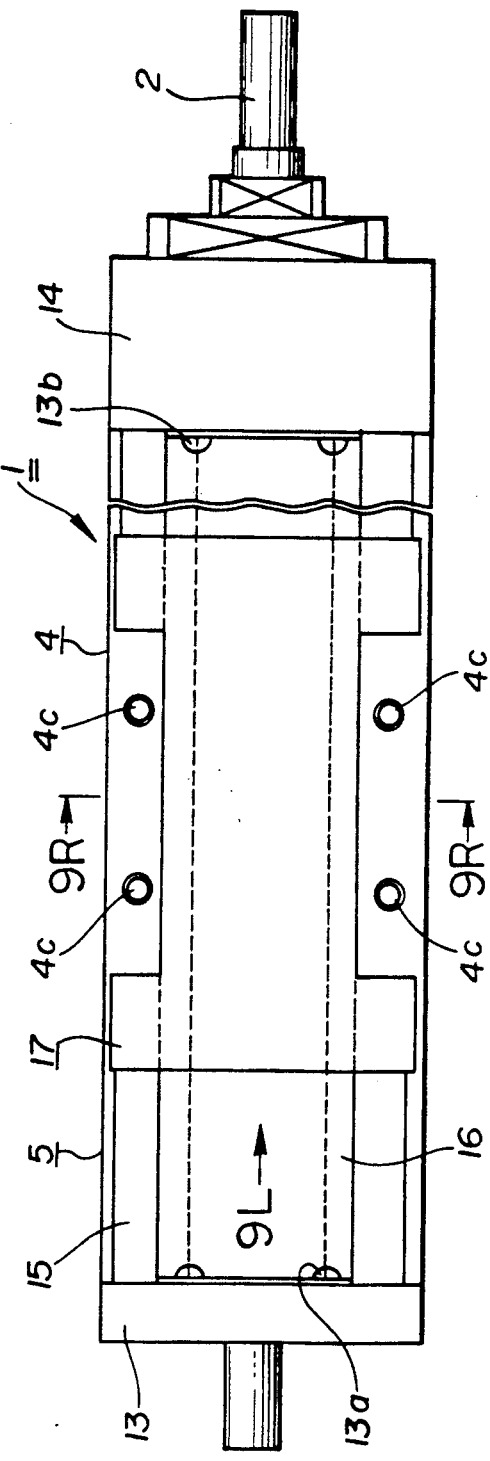
FIG. 2 is a plan view of the feed unit apparatus of FIG. 1.
Figure 3:
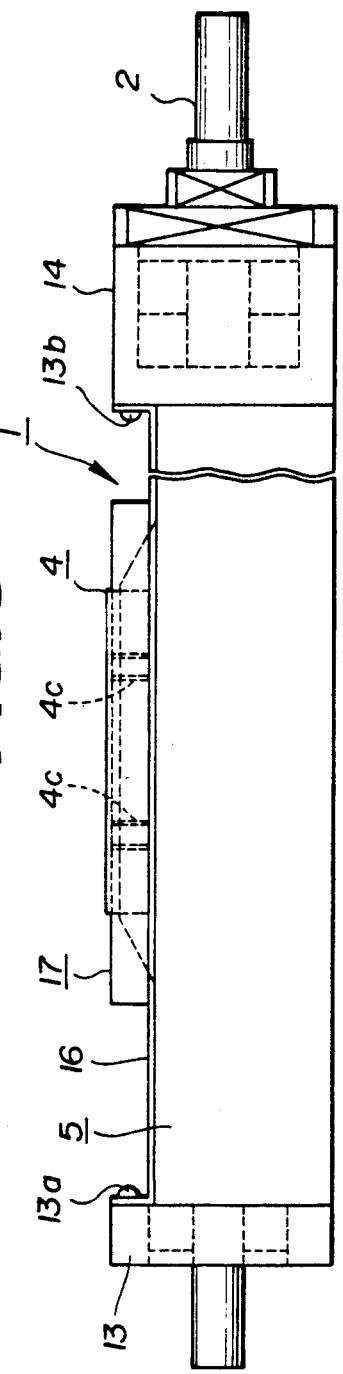
FIG. 3 is a side view of the feed unit apparatus of FIG. 1.

With reference to FIGS. 2 and 3, support units 13 and 14 are respectively secured by bolts to axial opposite ends (front and rear ends) of the guide rail 5 to rotatably support the ball screw shaft 2. On upper surfaces of both side walls 5b of the guide rail 5, as shown in FIGS. 1, 2 and 9, there are secured a pair of beltlike magnets 15 extending over the entire axial range of the recessed groove 5a.

As shown in FIGS. 4 and 9, the nut block 4 has a through bore 4d to allow the ball screw shaft 2 to pass therethrough. A spiral groove is formed in an inner peripheral surface of the through bore 4d, which engages the spiral groove 2a of the screw shaft 2 through a multiplicity of rolling members 3. An axially extending guide recess 40 is formed in an upper surface of the nut block 4 between the side walls 41. Holding channels 42 are respectively formed in inner surfaces of the side walls 41 so that the holding channels 42 extend axially and opposed to each other. Furthermore, a pair of holding recesses 43 are formed in each of the axial opposite end faces 41a and 41b of both of the side walls 41.

As shown in FIGS. 1 to 3 and 9, a seal plate 16 made of flexible steel plate is provided with its axial opposite ends secured respectively to the support units 13 and 14 by screws 13a and 13b so that the seal plate 16 covers the entire axial area of the upward opening of the recessed groove 5a. The seal plate 16 slidably engages the guide recess 40 of the nut block 4 and axially crosses over the nut block 4. At the same time, both lateral side edge portions of the seal plate 16 are attracted to the pair of strip-shaped magnets 15 at portions located before and behind the nut block 4 so that the seal plate 16 covers the entire axial area of the recessed groove 5a. Furthermore, a seal pressing member 17 is attached to the nut block 4 for pressing downwardly an expanding portion 16a of the seal plate 16, which expanding portion 16a axially crosses over the nut block 4.

Figure 6:
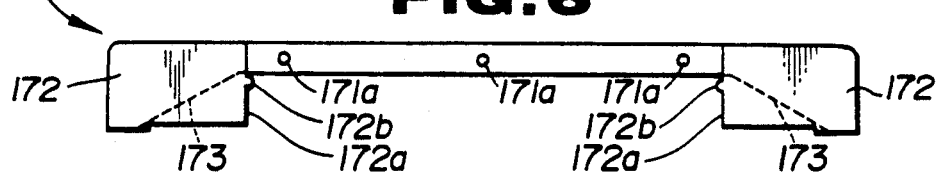
FIG. 6 is a side view of the seal pressing member as viewed in the direction of arrow 6 in FIG. 5.
Figure 7:
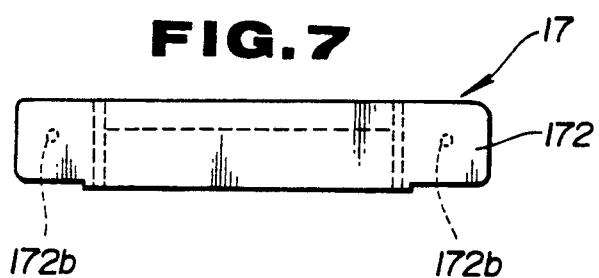
FIG. 7 is a front view of the seal pressing member as viewed in the direction of arrow 7 in FIG. 5.
Figure 8:
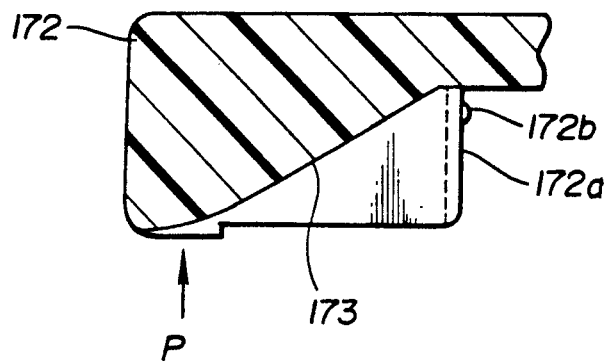
FIG. 8 is a sectional view generally taken along line 8—8 in FIG. 5.

As shown in FIGS. 2, 3 and 5 to 8, the seal pressing member 17 includes a center pressing portion 171 fitted between both of the side walls 41 of the guide recess 40 and both ends pressing portions 172 respectively having an axial inner surface 172a which respectively abut against axial opposite end faces 41a and 41b of both of the side walls 41. Three projections 171a are provided on each lateral side edge of the center pressing portion 171. The projections 171a are fitted into the holding channels 42. Furthermore, projections 172b are provided on each of the axial inner surfaces 172a. The projections 172b are fitted into the holding recesses 43. Moreover, each of the both ends pressing portions 172 has a slant surface 173 formed in a bottom surface so that the slant surface 173 opposes the slant surface 7b (see FIG. 11) of the end cap 7 and forms a gap between the two opposing slant surfaces 173 and 7b to allow the seal plate 15 to slidingly move through the gap. By pressing the expanded portion 16a which would otherwise protrude upwardly forming a convex form, the expanded portion 16a is deformed to a flat trapezoidal shape such that opposite end portions of the expanded portion 16a are brought into contact with the slant surfaces 173. Both lateral sides of each slant surface 173 are closed as shown in FIG. 6. The seal pressing member 17 having such a shape is formed integrally by a synthetic resin having a small slide friction coefficient. By fitting the projections 171a into the holding channels 42 by elastically deforming the seal pressing member 17, and by fitting the projections 172b respectively into the holding recesses 43, the seal pressing member 17 can be elastically attached to the nut block 4.

Figure 11:
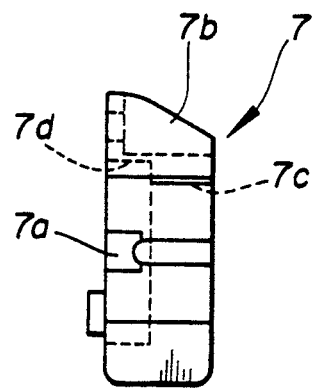
FIG. 11 is a view as viewed in the direction of arrow 11 in FIG. 10.

As shown in FIGS. 10 and 11, the end caps 7 are made from a synthetic resin having a small friction coefficient. Each of the end caps 7 has a through bore 7c for inserting the ball screw shaft 2 through the end caps 7 and an annular recess 7d into which an annular protrusion 44 (see FIG. 4) formed on each of the opposite end faces 4a and 4b of the nut block 4 is fitted. Each end cap 7 is also formed with the slant surface 7b for guiding the expanded portion 16a of the seal plate 16 towards the magnets 15. The end caps 7 are secured to the nut block 4 with the annular protrusions 44 of the nut block 4 respectively fitted into the annular recesses 7d, and by fastening screws 19 together with damper members 18 respectively abutting against the outer surfaces of the end caps 7 (see FIG. 9).

The damper members 18 serve also as seal members for preventing dust from entering the spiral groove 2a of the screw shaft 2 and the ball circulating paths 9 and the like from opposite ends of the nut block 4.

The operation of the embodiment of the invention will now be explained.

The seal plate 16 slidably engages the guide recess 40 of the nut block 4 and is attracted by the magnets 15 at portions located before and behind the expanded portion 16a which crosses axially over the nut block 4 so that the seal plate 16 covers the upper opening of the recessed groove 5a of the guide rail 5 over its axial entire area. The center pressing portion 171 of the seal pressing member 17 presses a center portion of the expanded portion 16a downwardly. At the same time, slant surfaces 173 of the both ends pressing portions 172 of the seal pressing member 17 bend the seal plate 16 at the front and rear ends of the expanded portion 16a downwardly towards the magnets 15 through the gaps formed between the slant surface 173 and the slant surface 7b of the end cap 7. As a result, the seal plate 16 is not substantially lifted from the magnets 15 at positions near the front and rear ends of the seal pressing member 17 such that a sufficient dust sealing property is insured.

Under such a condition, when the ball screw shaft 2 is rotated by being driven by a servo motor, not shown, the rotation of the ball screw shaft 2 is transmitted to the nut block 4 through rolling of the rolling members 3 which circulate within the ball circulating paths 8 with the rotation of the ball screw shaft 2. As a result, the nut block 4 moves rectilinearly in an axial direction (right or left direction) through rolling of the rolling members 6 which circulate within the ball circulating paths 9. With the rectilinear movement of the nut block 4, the expanded portion 16a of the seal plate 16 is displaced in the right or left direction. When the expanded portion 16a displaces in the right or left direction, as described in the foregoing, the seal plate 16 is not substantially lifted from the magnets 15 at the positions near the front and rear ends of the seal pressing member 17 such that a satisfactory dust sealing property is insured. As a result, sputters produced during welding, dust, or the like are prevented with certainty from entering the places of the ball screw shaft 2 and the rolling members 6 for linear guiding, and at the same time, contamination of the environment due to scattering of lubricating oil in the room is also prevented with certainty.

As described in the foregoing, in the feed unit apparatus according to the invention, a pair of belt-shaped magnets 15 are respectively secured to upper surfaces of both side walls of the guide rail 5 such that the strip-shaped magnets 15 extend over the whole axial range of the recessed groove of the guide rail 5. The nut block 4 is formed with an axially extending guide recess in an upper surface of the nut block 4. A flexible seal plate 16 is provided with its axial opposite ends fixed to opposite end portions of the guide rail 5. The flexible seal plate 16 axially crosses over the nut block 4 while slidably engaging the guide recess of the nut block 4. The flexible seal plate 16 is attracted to the strip-shaped magnets 15 at portions thereof before and behind the nut block 4 to cover the recessed groove of the guide rail 5. As seal pressing member 17 is attached to the nut block 4 to press downwardly an expanded portion of the seal plate 16, which portion axially crosses over the nut block 4.

By virtue of the above structure, since the expanded portion of the seal plate 16, which portion slidably engages the guide recess of the nut block 4 and axially crosses over the nut block 4, is pressed downwardly by the seal pressing member 17, and since the sale plate 16 covers the recessed groove of the guide rail 5 with both the lateral edge portions of the seal plate 16 being attracted by the pair of strip-shaped magnets 15 at portions located before and behind the nut block 4, the amount of lift of the expanded portion of the seal plate 16 from the magnets 15 at the front and rear ends of the expanded portion is reduced and sufficient dust sealing property is insured. As a result, sputters produced during welding, dust, or the like are completely prevented from entering the places of the ball screw shaft 2 and the rolling members for linear guiding. It is possible to prevent lubricating oil from scattering in the room which would contaminate the environment.

Furthermore, since the seal pressing member 17 is elastically attached to the nut block 4 with the projections of the seal pressing member 17 engaged with the channels of the nut block 4, it is possible to provide a feed unit apparatus in which the structure is simple, the manufacturing cost is low, and an easily assembled seal structure is provided.

Moreover, since the front and rear portions of the expanded portion of the seal plate 16 are bent towards the magnets 15 by the gaps between the slant surfaces of the seal plate 16 and the slant surfaces of the end caps, the amount of lift of the expanded portion of the seal plate 16 at the front and rear portions thereof from the magnets 15 is reduced, with the dust sealing property being improved by this reduction of lift.

Furthermore, since the end caps and the seal pressing member 17 are respectively made from a synthetic resin having a small friction coefficient, the frictional resistance encountered by the seal plate 16 when the nut block 4 is displaced becomes small such that the nut block 4 can be moved smoothly.

What is claimed is:

1. In a feed unit apparatus comprising a ball screw shaft having a spiral groove formed in an outer peripheral surface, a nut block threaded about the spiral groove through rolling members, a guide rail having an axially extending recessed groove opening upwardly, the guide rail guiding the nut block to move rectilinearly within the recessed groove through the rolling members which roll in ball circulating paths, and end caps respectively fixed to axial opposite ends of the nut block and having the ball circulating paths formed therein, the improvement comprising:

the nut block having a spiral groove formed in an inner surface thereof such that the spiral groove of the nut block opposes the spiral groove of the ball screw shaft, a plurality of balls fitted between the opposing spiral grooves of the nut block and the ball screw shaft as the rolling members;

the nut block having axial ball rolling grooves formed respectively in outer side surfaces thereof and having axial through bores respectively corresponding to the axial ball rolling grooves of the nut block, the spiral groove and the ball rolling grooves being formed in a single body of the nut block;

the guide rail having axial ball rolling grooves formed respectively in inner surfaces of side walls thereof so that the axial ball rolling grooves of the guide rail respectively oppose the axial ball rolling grooves of the nut block, a plurality of balls fitted as the rolling members between the opposing ball rolling grooves of the guide rail and the nut block;

each of the end caps having a pair of curved ball grooves respectively connecting the ball rolling groove and the through bore of the nut block to form the ball circulating paths;

a pair of strip-shaped magnets respectively secured to upper surfaces of both side walls of the guide rail such that the strip-shaped magnets extend over a whole axial range of the recessed groove;

the nut block being formed with a guide recess extending axially in an upper surface of the nut block;

a flexible seal plate having axial opposite ends thereof fixed to opposite end portions of the guide rail, the flexible seal plate slidably engaging the guide recess of the nut block and axially crossing over the nut block, the flexible seal plate being attracted to the strip-shaped magnets at portions located before and behind the nut block to cover the recessed groove of the guide rail, the flexible seal plate being formed of a metal sheet and covering both of the ball screw shaft and the recessed groove of the guide rail; and a seal pressing member attached to the nut block for pressing downwardly an expanded portion of the seal plate, the expanded portion axially crossing over the nut block, the seal pressing member being elastically attached to the nut block with projections of the seal pressing member engaged with channels formed in the nut block.

2. The improvement in a feed unit apparatus according to claim 1 wherein the end caps are respectively formed with slant surfaces for guiding the expanded portion of the seal plate towards the strip-shaped magnets, and the seal pressing member has slant surfaces respectively formed at opposite ends thereof so that a gap is formed between each of the slant surfaces of the end caps and opposing ones of the slant surfaces of the seal pressing member to thereby allow the seal plate to slidingly move through the gaps, and wherein the end caps and the seal pressing member are made from a synthetic resin having a small friction coefficient.

* * * * *